(12) United States Patent
Wu et al.

(10) Patent No.: US 8,949,175 B2
(45) Date of Patent: Feb. 3, 2015

(54) META-DATA DRIVEN DATA INGESTION USING MAPREDUCE FRAMEWORK

(75) Inventors: Mingxi Wu, San Mateo, CA (US); Songting Chen, San Jose, CA (US)

(73) Assignee: Turn Inc., Redwood City, CA (US)

( * ) Notice: Subject to any disclaimer, the term of this patent is extended or adjusted under 35 U.S.C. 154(b) by 53 days.

(21) Appl. No.: 13/466,981

(22) Filed: May 8, 2012

(65) Prior Publication Data
US 2013/0275363 A1    Oct. 17, 2013

Related U.S. Application Data

(60) Provisional application No. 61/625,528, filed on Apr. 17, 2012.

(51) Int. Cl.
G06F 17/30        (2006.01)
(52) U.S. Cl.
USPC .......................................................... 707/602
(58) Field of Classification Search
None
See application file for complete search history.

(56) References Cited

U.S. PATENT DOCUMENTS

| | | | | |
|---|---|---|---|---|
| 7,523,123 B2* | 4/2009 | Yang et al. | | 1/1 |
| 8,311,982 B2* | 11/2012 | Soules et al. | | 707/625 |
| 2007/0136324 A1 | 6/2007 | Xu et al. | | |
| 2008/0086442 A1* | 4/2008 | Dasdan et al. | | 707/1 |
| 2008/0120314 A1* | 5/2008 | Yang et al. | | 707/101 |
| 2011/0276962 A1* | 11/2011 | Chambers et al. | | 718/1 |
| 2013/0166568 A1* | 6/2013 | Binkert et al. | | 707/741 |

OTHER PUBLICATIONS

"Apache: MapReduce Tutorial", Hadoop Release 1,0,2, Apr. 3, 2012, 44 pages.
Grover, et al., "Extending Map-Reduce for Efficient Predicate-Based Sampling", 28th International Conference on Data Engineering (ICDE 2012), Arlington, VA Apr. 1-5, 2012, IEEE, pp. 486-497.
Stonebraker, et al., "MapReduce and parallel DBMSs: Friends or Foes", Communications of the ACM, vol. 53, No. 1, Jan. 1, 2010, p. 64.

* cited by examiner

Primary Examiner — Bai D. Vu
(74) Attorney, Agent, or Firm — Kwan & Olynick LLP

(57) ABSTRACT

A generic approach for automatically ingesting data into an HDFS (Hadoop File System) based data warehouse includes a datahub server, a generic pipelined data loading framework, and a meta-data model that, together, address data loading efficiency, data source heterogeneities, and data warehouse schema evolvement. The loading efficiency is achieved via the MapReduce scale-out solution. The meta-data model is comprised of configuration files and a catalog. The configuration file is setup per ingestion task. The catalog manages the data warehouse schema. When a scheduled data loading task is executed, the configuration files and the catalog collaboratively drive the datahub server to load the heterogeneous data to their destination schemas automatically.

27 Claims, 5 Drawing Sheets

META-DATA DRIVEN DATA INGESTION USING MAPREDUCE FRAMEWORK

CROSS REFERENCE TO RELATED APPLICATIONS

This application claims priority to U.S. provisional patent application Ser. No. 61/625,528, filed Apr. 17, 2012, which is incorporated herein in its entirety by this reference thereto.

BACKGROUND OF THE INVENTION

1. Technical Field

The invention relates to efficiently loading heterogeneous sources of data into a data warehouse with constantly evolving schemas. More particularly, the invention relates to a meta-data driven data ingestion using a MapReduce framework.

2. Description of the Background Art

In the big data field, a data warehouse is usually built on top of a scalable cluster system, such as Hadoop. Hadoop is an open source distributed computing environment using MapReduce. MapReduce is a framework for processing highly distributable problems across huge datasets using a large number of computers (nodes), collectively referred to as a cluster (if all nodes use the same hardware) or a grid (if the nodes use different hardware). Computational processing can occur on data stored either in a file system (unstructured) or in a database (structured).

"Map" step: The master node takes the input, divides it into smaller sub-problems, and distributes them to worker nodes. A worker node may do this again in turn, leading to a multi-level tree structure. The worker node processes the smaller problem, and passes the answer back to its master node.

"Reduce" step: The master node then collects the answers to all the sub-problems and combines them in some way to form the output, i.e. the answer to the problem it was originally trying to solve.

MapReduce allows for distributed processing of the map and reduction operations. Provided each mapping operation is independent of the others, all maps can be performed in parallel, although in practice it is limited by the number of independent data sources and/or the number of CPUs near each source. Similarly, a set of reducers can perform the reduction phase, provided all outputs of the map operation that share the same key are presented to the same reducer at the same time. While this process can often appear inefficient compared to algorithms that are more sequential, MapReduce can be applied to significantly larger datasets than commodity servers can handle. Thus, large server farm can use MapReduce to sort a petabyte of data in only a few hours. The parallelism also offers some possibility of recovering from partial failure of servers or storage during the operation: if one mapper or reducer fails, the work can be rescheduled, assuming the input data is still available.

The Hadoop File System (HDFS) is a distributed, scalable, and portable file system written in Java for the Hadoop framework. Each node in a Hadoop instance typically has a single data node; a cluster of data nodes form the HDFS cluster. The situation is typical because each node does not require a data node to be present. Each data node serves up blocks of data over the network using a block protocol specific to HDFS. The file system uses the TCP/IP layer for communication; clients use RPC to communicate between each other. HDFS stores large files (an ideal file size is a multiple of 64 MB), across multiple machines. It achieves reliability by replicating the data across multiple hosts, and hence does not require RAID storage on hosts. With the default replication value, e.g. 3, data is stored on three nodes: two on the same rack, and one on a different rack. Data nodes can talk to each other to rebalance data, to move copies around, and to keep the replication of data high. Such data warehouse is of the size of hundreds of terabytes or petabytes, and the schemas of the data warehouse are constantly evolving. One practical problem in using such a system is how to load heterogeneous sources of data efficiently into a data warehouse with constantly evolving schemas.

SUMMARY OF THE INVENTION

Embodiments of the invention provide a generic approach for automatically ingesting data into an HDFS-based data warehouse. Embodiments include a datahub, a generic pipelined data loading framework, and a meta-data model that, together, address data loading efficiency, data source heterogeneities, and data warehouse schema evolvement. "The generic loading framework, datahub, uses a MapReduce framework to address loading efficiency. The meta-data model is comprised of configuration files and a catalog. The configuration file is setup per ingestion task. The catalog manages the data warehouse schema. When a scheduled data loading task is executed, the configuration files and the catalog collaboratively drive the datahub to load the heterogeneous data to their destination schemas automatically.

DETAILED DESCRIPTION OF THE INVENTION

Embodiments of the invention provide a generic approach for automatically ingesting data into an HDFS-based data warehouse. Embodiments include a datahub, a generic pipelined data loading framework, and a meta-data model that, together, address data loading efficiency, data source heterogeneities, and data warehouse schema evolvement. The meta-data model is comprised of configuration files and a catalog. The configuration file is setup per ingestion task. The catalog manages the data warehouse schema. When a scheduled data loading task is executed, the configuration files and the catalog collaboratively drive the datahub to load the heterogeneous data to their destination schemas automatically.

In one particular application, embodiments of the invention provide techniques that can automate the loading of marketing-related data into a database. In the case of increasing customer demands that require the integration all sources of an online advertising campaign or other media channel, such as video, social, email, etc. there are multiple media channels. Marketers and advertisers typically spread their advertising purchases over all of the different channels and not necessarily with a particular media provider. Thus, there is an overarching concern that such marketers and advertisers should be able to access a central dashboard to integrate all of their media spending, and they then can have a global view of where their advertising budget is spent and what the aggregated expenses are across the different media channels.

To facilitate this requirement, embodiments of the invention provide a fixed-key ingestion automation framework. Heterogeneous data sources encountered across these different media channels have different data schema. To integrate these heterogeneous data sources into one common schema so that marketers and advertisers can query them on a single platform, it is necessary to perform an accurate schema mapping. Thus, one aspect of the invention integrates the heterogeneous schema.

Figure 1:
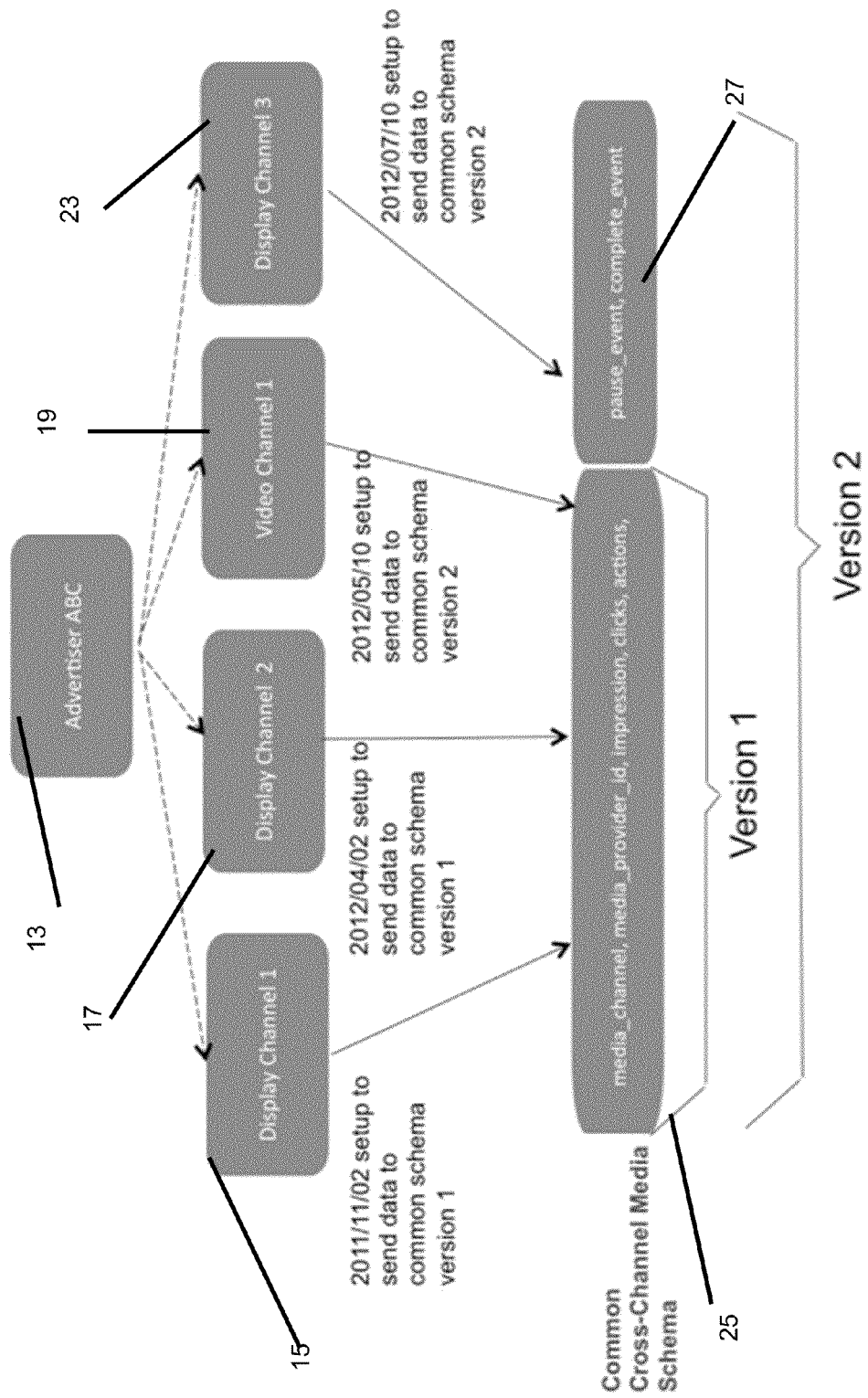
FIG. 1 is an architectural diagram of an advertising ecosystem showing the heterogeneous data sources as ad servers and the like, and showing the evolving schema vis-a-vis their channels according to the invention.

FIG. 1 is an architectural diagram of an advertising ecosystem showing the heterogeneous data sources as ad servers and the like, and showing the evolving schema vis-a-vis their channels. As illustrated in FIG. 1, an advertiser 13 ABC is working with Display Channels 1-3 (15, 17, 23), and Video Channel 1 (19). Each channel has report data for the advertiser ABC. The advertiser ABC wants to integrate the reports in one common schema provided by a platform, such as that offered by Turn, Redwood City, Calif. The advertiser requests each channel it works with to send the report to Turn's common cross-channel media schema 25, 27, so that a simple query against the common schema shows a cross-channel report. In FIG. 1, the setup for advertiser ABC's ingestion requests occur at different times. On Nov. 2, 2011, advertiser ABC requested display channel 1 to send its report data to Turn's common schema version 1 (25). Turn then setup a configuration file to ingest the data automatically daily. Five months later, on Apr. 2, 2012, ABC requested display channel 2 to send its report data to Turn's common schema version 1, a configuration file was setup accordingly. One month later, on May 10, 2012, advertiser ABC uses Video Channel 1 as its media. So, it requested the new channel to send report to Turn's common schema. However, because the video channel has some special fields that were not defined in Turn's common schema version 1, Turn evolved the common schema to version 2 (27) by adding two more columns (pause_event, complete_event). With these changes, video channel 1 can be setup to ingest data to Turn's common schema. Two months later, on Jul. 10, 2012, ABC requests Turn to setup another configuration to ingest display channel 3's data. Because the schema has been evolved, this time, the configuration file targets the version 2 of the common schema. The invention makes the ingestion request in this dynamic business scenario very smooth. A legacy configuration setup never needs to be modified when the common schema is evolving. After ingesting heterogeneous data, a simple query against the common schema's storage can display a cross-channel report, which provides a global view of the media spending for advertiser ABC.

Data Ingestion Hardware Architecture

Figure 2:
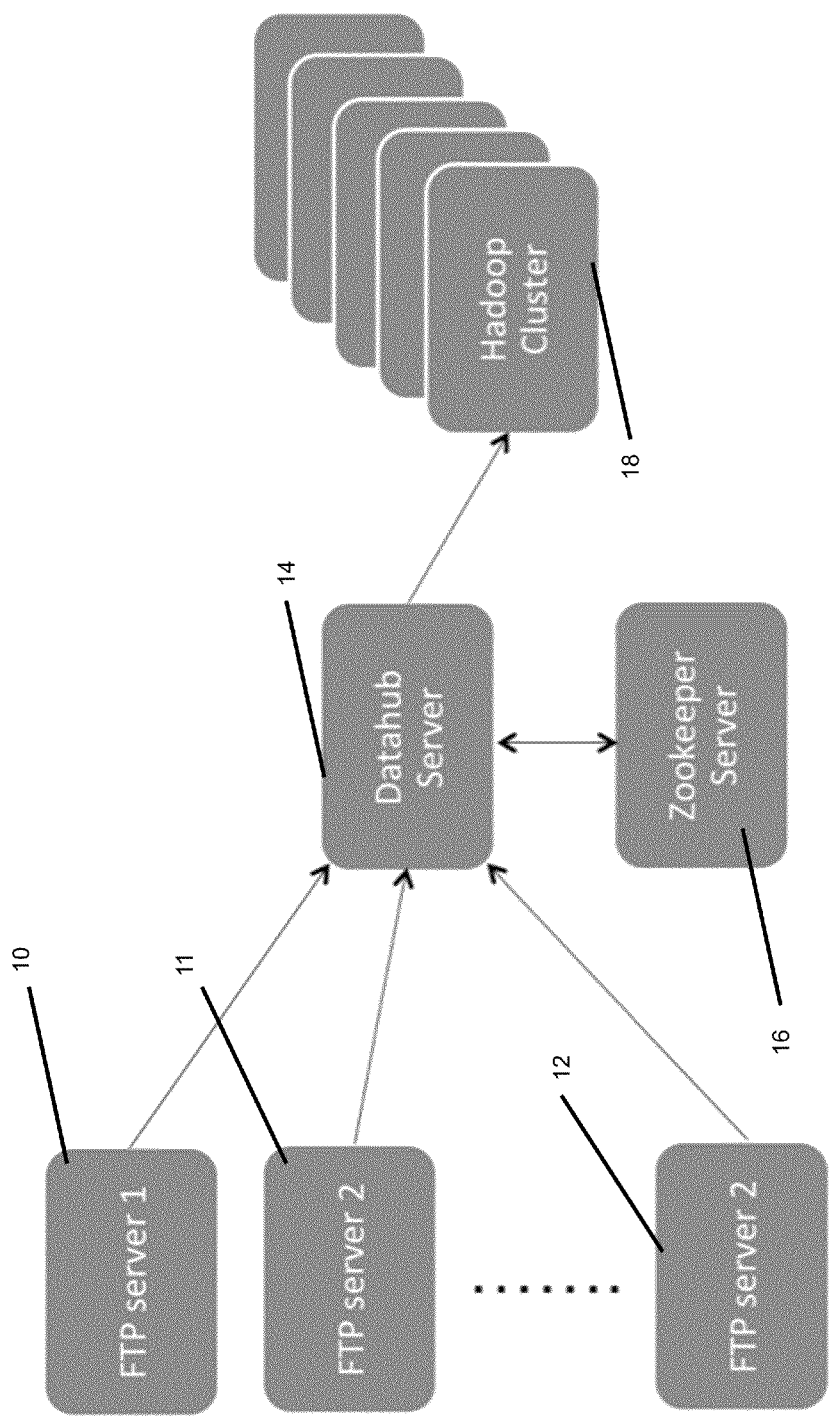
FIG. 2 is a block schematic diagram that illustrates the data loading hardware architecture according to the invention.

FIG. 2 is a block schematic diagram that illustrates the data loading hardware architecture according to the invention. In this embodiment, data is received from different FTP servers 10-12 and loaded into a Hadoop cluster 18, which comprises hundreds of connected commodity personal computers with Hadoop software management. A datahub server 14 is responsible for supervising the data loading. The datahub server spawns a series of jobs to accomplish the loading task. Some jobs run on the datahub server, some jobs run on the Hadoop cluster, depending on the job nature. The datahub server also monitors and coordinates pipeline jobs by communicating with the Hadoop cluster and a ZooKeeper server 16.

For purposes of the discussion herein, a ZooKeeper server is a distributed, open-source coordination service for distributed applications. It exposes a simple set of primitives that distributed applications can build upon to implement higher level services for synchronization, configuration maintenance, and groups and naming. It is designed to be easy to program to, and uses a data model styled after the familiar directory tree structure of file systems. It runs in Java and has bindings for both Java and C.

For purposes of the discussion herein, the skilled person will appreciate and be familiar with such elements of the invention as Hadoop, MapReduce, ZooKeeper, and the like. Further, it should be appreciated that the invention herein is not limited to any particular arrangement of these elements, nor is it limited to the use of these elements alone or in any combination.

Datahub Server

Figure 3:
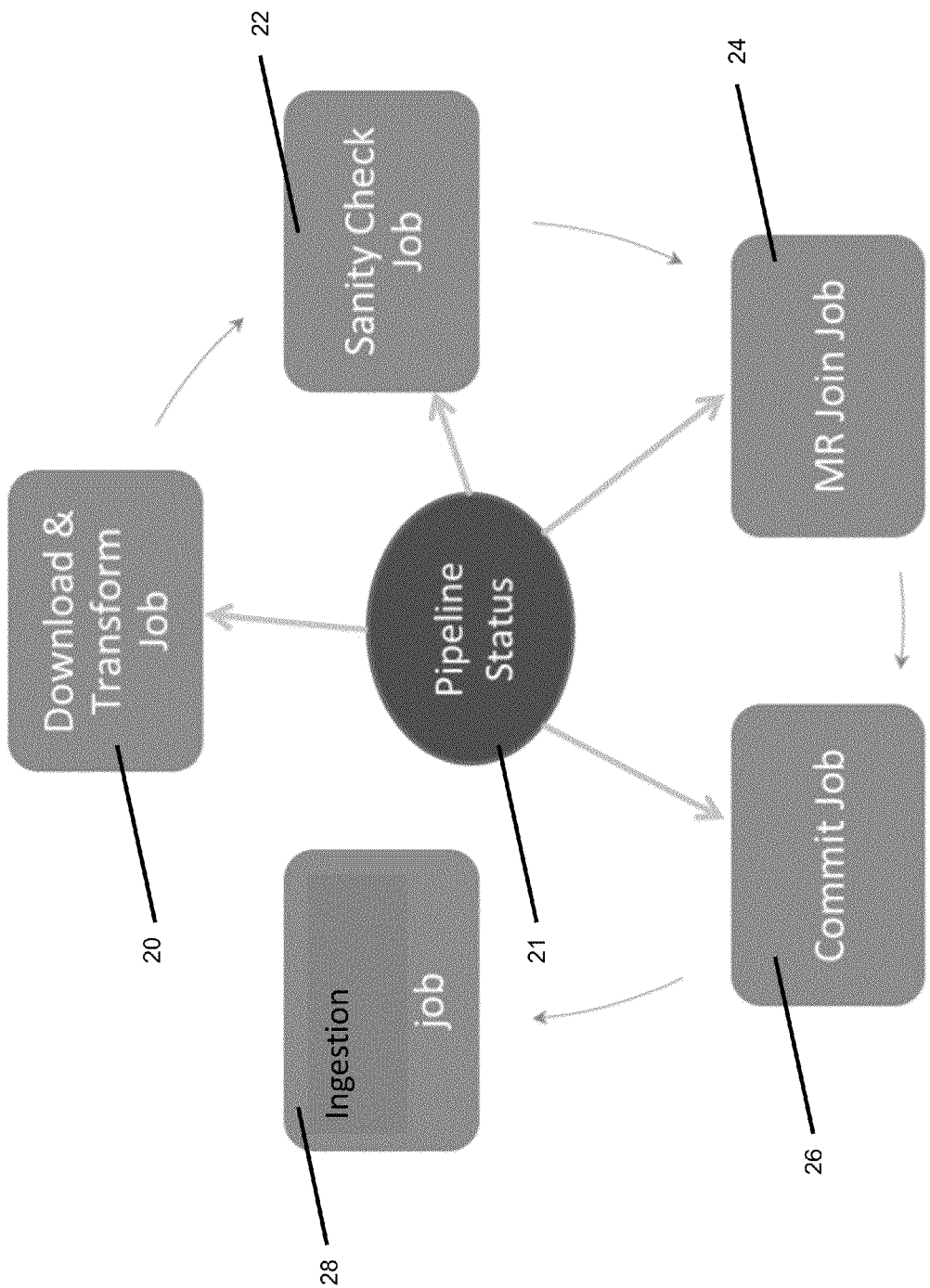
FIG. 3 is a block schematic diagram that illustrates the datahub server as a generic data loading framework according to the invention.

FIG. 3 is a block schematic diagram that illustrates the datahub server as a generic data loading framework according to the invention. Each ingestion task takes the source files and ETL (Extracts, Transforms, and Loads) the data through a pipeline to a destination location. The pipeline has five linearly dependent jobs running one after another. Each job has a special task in the data ingestion pipeline. The progress of this pipeline is monitored by a pipeline status file 21 which resides in a persistent storage medium, such as an HDFS cluster. The synchronization of access to the pipeline status file is done via the communication between datahub and ZooKeeper server, which is a server using ZooKeeper software to provide a distributed lock service (see FIG. 2). The pipeline is run sequentially. For each stage, it may invoke MapReduce jobs on the Hadoop cluster to accomplish its corresponding task.

The datahub server data loading process consists of five stages:

1. Download and transform job (20): The job runs on the datahub server. It refers to a configuration file (discussed below) and pipeline status files to determine where, what, and how to download the source files to a local working directory, and then transform the files (mainly uncompress the files, if necessary) on the datahub server.

2. Sanity check job (22): This is a MapReduce job driven by the datahub server and running on a Hadoop cluster. It parses the input files once, and determines whether the input file is a valid data source. It then passes the valid input files to the next job in the pipeline and a map reduce job is used here to reduce the data parsing time significantly.

3. MR join job (24): This job is a MapReduce job driven by the datahub server and running on a Hadoop cluster. It first reads both the newly arrived clients' files and the existing destination data warehouse files. Next, it does a join of the two data sources and produces the result for the next job to consume. Again, a map-reduce job is used here to parse data efficiently.

4. Commit job (26): This job is a simple wrap-up job driven by the datahub server and running on a Hadoop cluster. It renames the previous MapReduce job output folders to an output folder, whose contents are to be consumed by the ingestion job. It also updates pipeline status files to indicate the progress of the loading.

5. Ingestion job (28): This job is a MapReduce job running on a Hadoop cluster. It consumes all the join output from the previous stages of the pipeline and ingests all of the join results into the destination data files.

Meta-Data

The datahub server provides a framework that leverages the MapReduce computing environment to route the source data to the destination. It consults the meta-data to carry out different instances of the pipeline to perform the actual ingestion tasks.

For example, in FIG. 3, the Download and Transform job 20 reads a configuration file to decide which FTP server to access, what account credential to use to download which files, how to parse the downloaded files, and where to upload these files on HDFS. Next, the sanity check job 22 reads the configuration files to decide where to get the input files and how to parse the files. It also consults the catalog to convert the parsed data to the configured destination schema record. The MR join job 24 refers to the configuration files and catalog to do similar things. The commit job 26 consults the configuration file to decide where to put the output data from the previous job in the pipeline.

The separation of the program and the meta-data has the benefit of having a clean cut between the program and meta-data, such that program optimization and work flow modeling can be conducted independently and generically.

The following discussion details meta-data modeling during data ingestion. Meta-data modeling consists of two parts: The first part is destination schema modeling, where a catalog is used; and the second part is modeling of the client configuration where, per ingestion task, a configuration file is setup.

Catalog

In big data management, dynamic business requirements frequently change common schema. Supporting schema evolution without changing code is a must. Embodiments of the invention model a destination schema using the following schema properties:

Schema_IDs: This property maintains an integer array representing all of the available schemas. For each table schema, a unique integer is assigned as its ID. For example, Schema_IDs=1,2,3 means that there are three tables with IDs 1, 2, and 3, respectively.

ID.name: This property stores the descriptive name of the table identified by ID. For example, 1.name=dmp.ica_aggs means that table 1's name is dmp.ica_aggs.

ID.latestVersion: This property stores the latest version of the table identified by ID. For example, 1.latestVersion=3 means that table 1's schema has 3 versions, and the latest version is 3.

ID.hdfsStorage: This property stores the absolute HDFS path where the table identified by ID is stored. For example, 1.hdfsStorage=/analytical_profile/eaup/aggaup/ means that table 1 is physically stored at/analytical_profile/eaup/aggaup/ on the HDFS file system.

ID.version: This property stores the versioned schema of the table identified by ID. For example, 1.1=long media_channel_id, long media_provider_id; media_channel_id means that table 1, version 1's schema has two columns: long media_channel_id and long media_provider_id. The key of this table is media_channel_id.

ID.Version.default: This property stores the default values of the versioned schema of the table identified by ID. For example, 1.1.default=1,0 means that table 1 version 1 has two default values: 1 is the default value of the first column, and 0 is the default value of the second column.

With the above properties, the system herein disclosed records the evolvement history of each schema. Therefore, the system can dynamically evolve a record from an earlier version of a given schema to a later version of the same schema by consulting the catalog.

For example, suppose that there is a record using schema version K. The evolvement of the record to the same schema but version K+1 can be done in two steps.

Step 1: First, the system creates a default record of the same schema using version K+1. The default record is instantiated with the default values of version K+1.

Step 2: Next, the system looks up the catalog to find the differences between version K and version K+1's schemas, and automatically uses version K's data to replace the data in the default record created in Step 1. If there is a correspondence between version K's column and version K+1's column, a direct copy is performed, with type casting if it is necessary. If there is no such correspondence for a version K's column, that column is dropped.

After the above two steps are completed, the new record created contains version K+1's schema with either the version K's data or the default value of version K+1.

Configuration File

Another challenge in big data integration is that of reconciling source data heterogeneity. Different data vendors have different local schemas and hardware architectures. To pull all kinds of the heterogeneous data into a central place and manage such data, it is necessary to address the inherit heterogeneities in an accurate and efficient way. Embodiments of the invention provide a system that uses a configuration file setup per data ingestion task to address this issue. Specifically, it is necessary to address schema mapping and miscellaneous heterogeneity issues, such as date format, FTP site location, etc.

The following properties of the configuration files are available and they can be easily extended to address the requirement per ingestion task:

Destination schemaID, schemaVersion: These two properties tell which schema and version do the source files go to. For example, schemaID=1,schemaVersion=1 means that the ingestion task ingest source data into version 1 of table 1.

Date Pattern: This property tells what is the date format used by the source data. For example, datePattern=M/d/yyyy H:mm means that the source data uses a specific date format, such as 06/04/2010 10:12.

Schema Mapping: This property defines the mappings between the source data's schema and the destination schema. For example, mapping=−1,4 means that the source schema's first column has no corresponding column in the destination schema, and the source schema's second column corresponds to the fourth column in the destination schema.

Partition Name: This property identifies to which physical table partition the source data goes. For example, partitionName=Turn__44 means that the source files are ingested to the destination schema in the partition named Turn__44.

ftpProtocol: This property identifies the file transfer protocol. For example, SFTP means that the secure FTP protocol is used to pull the data from the data source.

userID: This property identifies the user name that is used to login to the data source server.

password: This property identifies the password that is used to login to the data source server.

Ingesting Different Version Source Data to a Common Schema

The catalog model's schema is based on version. One can easily modify the catalog to evolve schema. As a consequence, there are different versions data of the same schema within the data warehouse. Embodiments of the invention provide a method to load and query different versions of data in the same schema in the Hadoop cluster.

A key part of this method is the provision of a record abstraction and an API to handle the reconciliation:

Record abstraction: A record is a class (data structure) storing one tuple of a given schema and a given version combination. It consists of a value array and a versioned schema. The value array holds the binary of the data. The schema keeps the meta-data for the data. The schema is an in-memory representation of a versioned schema specified in the catalog.

convertToLatestSchema( ): The record class has a function called convertToLatestSchema( ). When this function is invoked, the current record is converted to the latest version of the current record's schema. For example, a record holds the data of schema 1 version 1. The schema's latest version is 4. After the record's convertToLatestSchema( ) function is called, the record holds the data for the same schema but version 4.

Figure 4:
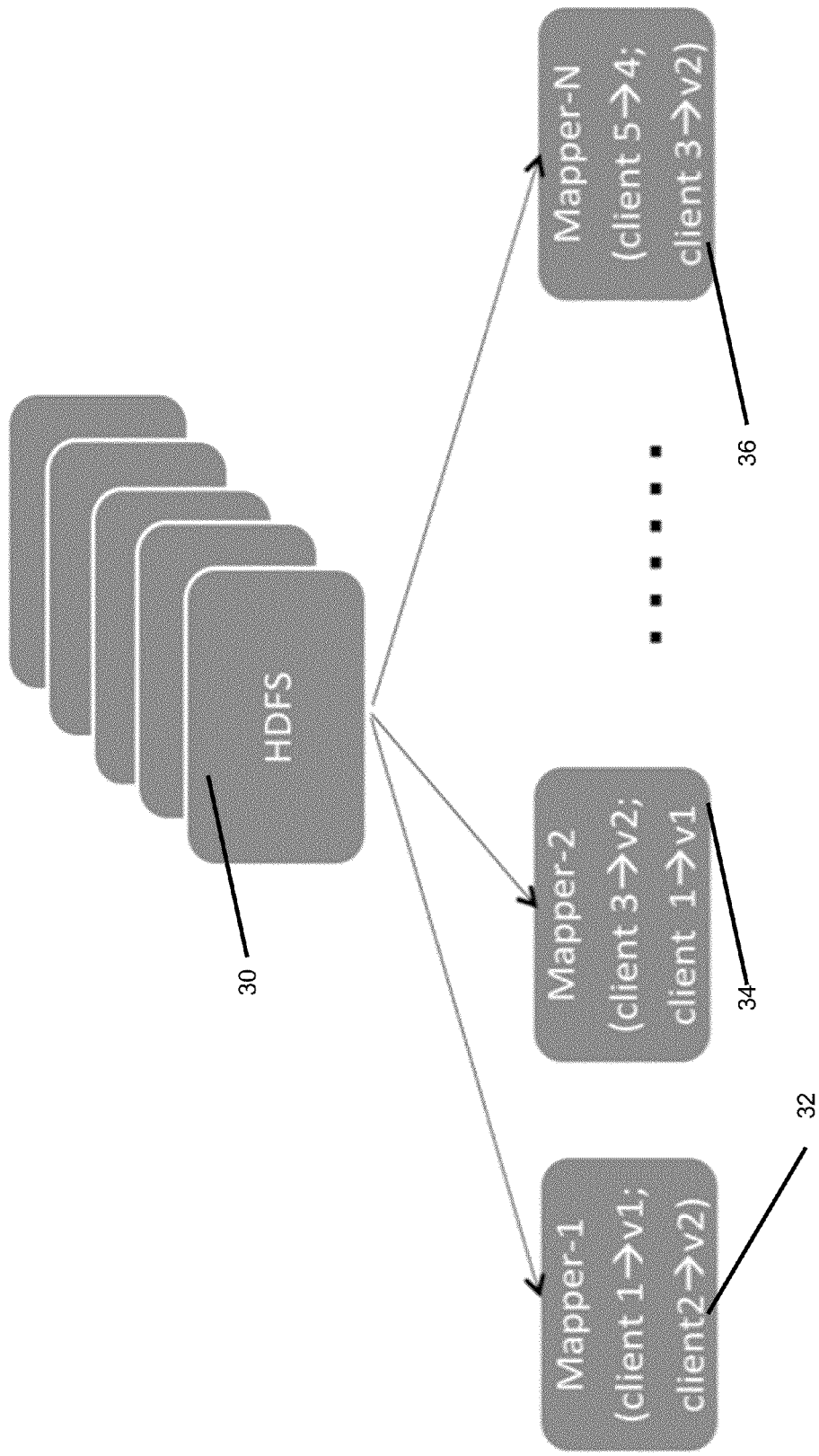
FIG. 4 is a block schematic diagram that illustrates different configuration setups to instruct different clients' data go to different versions of the same schema and the version heterogeneity is reconciled in the mappers of one map-reduce job according to the invention.

FIG. 4 is a block schematic diagram that illustrates different configuration setups to instruct different clients' data go to different versions of the same schema and the version heterogeneity is reconciled in the mappers of one map-reduce job according to the invention. This is a case one scenario, where different versions of the schema are used in a MapReduce task, and it shows how the record data structure is used to reconcile the heterogeneity seamlessly.

In FIG. 4, many configuration files are set up to ingest client 1, client 2, . . . client N's data into a common schema with version 1, version 2 . . . , version M. The place these different sources of data meet each other is in the mapper function of the MapReduce framework.

The datahub server first follows the configuration files to load all the different sources of data into the HDFS file system 30. Next, one MapReduce job is launched to join all of these heterogeneous data sources with the existing data in the common destination schema. Due to different setup time, different client's data may go to different versions of the same schema. For example, client 1's data may be setup to go to version 1 of the schema, and client 2's data may be setup to go to version 2 of the schema. A join task is performed to join these client's data with the existing data of the same schema. To perform the join task efficiently, a MapReduce job is launched which reads all of the new arrival data and the existing data of the destination schema, and which performs the join in the reducer of the MapReduce framework. The caveat to handle the different versions of the data is to call convertToLatestSchema( ) in the mapper( ) 32, 34, 36 for each record before anything else. This enforcement ensures that only the latest version record of the same schema is processed.

For example, in FIG. 4 mapper 1 (32) reads client 1's data, and it is setup to map to version 1's schema. It also reads client 2's data, which is setup to map to version 2's schema. They meet each other in the same mapper. The InputFormat of the MapReduce framework parses client 1's data to a record with version 1 schema, and parses client 2's data to a record with version 2 schema. The system calls convertToLatestSchema( ) to convert the two different versions' records to the latest version, and then the data flow proceeds to flow from mapper to reducer in the MapReduce framework.

Another scenario where different versions data of the same schema may flow together in a Hadoop cluster is applied at query time. For example, the system stores different versions of data in the Hadoop cluster, and it is desired to query them at the same time. Again, one can use this technique to convert different versions of data to the latest version at the place they meet each other, i.e. at the mapper.

Summary of Meta-Data Driven Data Ingestion

In summary, embodiments of the invention provide a meta-data driven data ingestion method for massive integration of heterogeneous data sources in a Hadoop MapReduce environment. Core components of a presently preferred embodiment include the datahub server, catalog, and configuration files, which provide the flexibility necessary in a dynamic big data integration environment.

Embodiments of the invention provide a method that handles, inter alia, the following challenges of the big-data data warehouse integration task (note: high level approaches to solve the challenge are listed under each challenge):

Scalability (load as much as possible within loading window)
  Hadoop MapReduce jobs
  Multiple ftp servers
  Schedule concurrent loading
Heterogeneity (different format/contracts/key/transfer protocol/ftp servers/destination schemas)
  Configuration files
  Catalog
Fault tolerance (auto recovery on the next load)
  Store loading status on HDFS file named Pipeline Status
  A fault tolerance protocol is designed using the pipeline status file
Immunity (shield from dirty data)
  Sanity check before loading using the sanity check MapReduce job
Synchronization (coordinate conflicting pipelines)
  Using distributed lock service provided by Zookeeper
  Using persistent status file stored on HDFS
Schema Evolvement (support different versions of the same schema to adapt different legacy ingestion setup)
  Versioned database schemas tracked in a center meta-data repository, the catalog With this ingestion method, besides its great efficiency, there is also the following flexibility:

Adding a table is as simple as add some text lines in the Catalog
Evolving a schema is as simple as adding a new version of the schema in the Catalog
Ingesting different versions of clients' data at the same time
Example (later setup does not affect legacy setup)
  Client 1 ingest files to schema 1 version 1
  Client 2 ingest files to schema 1 version 2
  Client 3 ingest files to schema 1 version 3
Client can change their file schema, one can change configuration mapping without changing code
Client can request adding/dropping/changing order of fields in the common destination schema, one can change the catalog
Flexibly handles all kinds of heterogeneity encountered in data integration (date format, file format, etc.)

Computer Implementation

Figure 5:
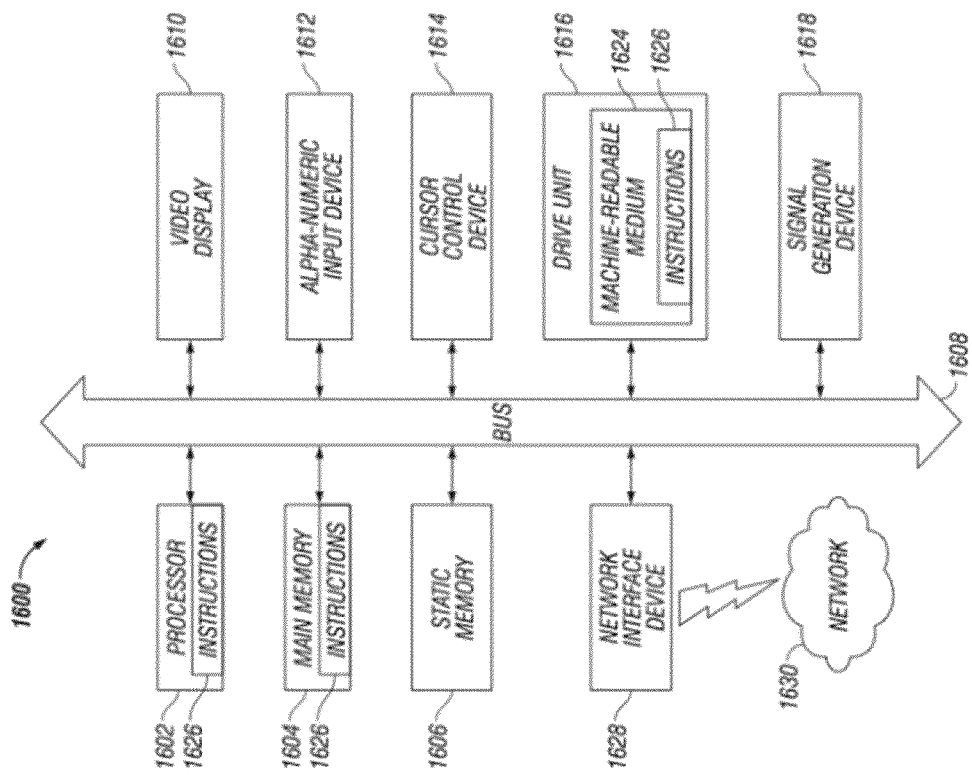
FIG. 5 is a block schematic diagram of a machine in the exemplary form of a computer system within which a set of instructions for causing the machine to perform any of the herein disclosed methodologies may be executed.

FIG. 5 is a block schematic diagram of a machine in the exemplary form of a computer system 1600 within which a set of instructions for causing the machine to perform any of the foregoing methodologies may be executed. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a processor 1602, a main memory 1604 and a static memory 1606, which communicate with each other 5 via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with complementary metal oxide semiconductor (CMOS), transistor-transistor logic (TTL), very large systems integration (VLSI), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for automatically ingesting data into a data warehouse, comprising:
   providing a datahub server for executing data loading tasks;
   providing a generic pipelined data loading framework that leverages a MapReduce environment for ingestion of a plurality of heterogeneous data sources; and
   providing a processor implemented meta-data model comprised of a plurality of configuration files and a catalog;
   wherein a configuration file is setup per ingestion task;
   wherein said catalog manages data warehouse schema;
   wherein when a scheduled data loading task is executed by said datahub server; and
   wherein said configuration files and said catalog collaboratively drive the datahub server to load the heterogeneous data to their destination schemas automatically and independently of data source heterogeneities and data warehouse schema evolvement.

2. The method of claim 1, wherein said data sources comprise marketing-related data from a plurality of different media channels.

3. An apparatus for automatically ingesting data into a data warehouse, comprising:
   a datahub server for executing data loading tasks comprising heterogeneous data received from a plurality of different servers;
   a generic pipelined data loading framework that leverages a MapReduce environment for ingestion of a plurality of heterogeneous data sources; and
   a processor implemented meta-data model comprised of a plurality of configuration files and a catalog;
   wherein a configuration file is setup per ingestion task;
   wherein said catalog manages data warehouse schema;
   wherein when a scheduled data loading task is executed by said datahub server; and
   wherein said configuration files and said catalog collaboratively drive the datahub server to load the heterogeneous data to their destination schemas automatically and independently of data source heterogeneities and data warehouse schema evolvement into a Hadoop cluster.

4. The apparatus of claim 3, wherein said datahub server monitors and coordinates pipeline jobs by communicating with the Hadoop cluster and a ZooKeeper server.

5. The apparatus of claim 4, wherein each ingestion task receives source files and extracts, transforms, and loads data comprising said source files through said pipelined data loading framework to a destination location;
   wherein progress of said pipelined data loading framework is monitored by a pipeline status file;
   wherein synchronization of access to said pipeline status file is performed via communication between said datahub server and said ZooKeeper server.

6. The apparatus of claim 3, wherein said pipelined data loading framework is run sequentially; and
   wherein for most stages, said pipelined data loading framework invokes MapReduce jobs on said Hadoop cluster to accomplish a corresponding task.

7. The apparatus of claim 3, wherein said data sources comprise marketing-related data from a plurality of different media channels.

8. A method for automatically ingesting data into a data warehouse, comprising:
   providing a datahub server for executing data loading tasks;
   providing a generic pipelined data loading framework leverages a MapReduce environment for ingestion of a plurality of heterogeneous data sources; and
   providing a processor implemented meta-data model comprised of a plurality of configuration files and a catalog;
   wherein a configuration file is setup per ingestion task;
   wherein said catalog manages data warehouse schema;
   wherein when a scheduled data loading task is executed by said datahub server;
   wherein said configuration files and said catalog collaboratively drive the datahub server to load the heterogeneous data to their destination schemas automatically and independently of data source heterogeneities and data warehouse schema evolvement;

said datahub server executing said data loading task by:
downloading and transforming a job running on said datahub server by referring to a configuration file and pipeline status files to determine where, what, and how to download the data source files to a local working directory, and then transforming the files.

9. The method of claim 8, wherein said job comprises any of a sanity check job, MapReduce (MR) join job, ingestion job, download and transform job, and commit job, and wherein said sanity check job, MR join job, and ingestion job each comprise a MapReduce job driven by the datahub server and running on a Hadoop cluster.

10. The method of claim 8, said datahub server executing said data loading task by performing the further step of:
sanity checking said job;
said datahub server driving a MapReduce job to parse input files produced by said downloading and transforming once, determining whether the input file is a valid data source, and then passing valid input files to a next job in the pipelined data loading framework.

11. The method of claim 10, said datahub server executing said data loading task by performing the further step of:
MapReduce (MR) joining said job by using a MapReduce framework, first reading both newly arrived clients' files and existing destination data warehouse files, and then performing a join of the newly arrived clients' files and existing destination data warehouse files to produce a result for a next job to consume.

12. The method of claim 11, said datahub server executing said data loading task by performing the further step of:
committing the job by renaming previous job output folders to an output folder whose contents are to be consumed by an ingestion job.

13. The method of claim 12, said datahub server executing said data loading task by performing the further step of:
ingesting said MapReduce job, by consuming all join output from previous stages of the pipeline and ingesting all join results into destination data files.

14. A datahub server, comprising:
a processor implemented framework for leveraging a MapReduce environment to route source data to a destination;
said framework consulting meta-data to carry out different instances of a pipeline to perform ingestion tasks;
wherein meta-data modeling during data ingestion comprises destination schema modeling via a catalog, and client configuration modeling per ingestion task via a configuration file.

15. The datahub server of claim 14, said catalog supporting schema evolution without changing framework code by modeling destination schema using any of the following schema properties:
a property that maintains an integer array representing all available schemas, wherein for each table schema, a unique integer is assigned as its identity (ID);
a property that stores a descriptive name of a table identified by ID;
a property that stores a latest version of a table identified by ID;
a property that stores an absolute Hadoop file system (HDFS) path where a table identified by ID is stored;
a property that stores a versioned schema of a table identified by ID; and
a property that stores default values of a versioned schema of a table identified by ID;

wherein said properties record an evolvement history of each schema; and
wherein a record can be dynamically evolved from an earlier version of a given schema to a later version of the same schema by consulting said catalog.

16. The datahub server of claim 15, wherein record evolvement to a same schema from a first version to a second version comprises:
creating a default record of a same schema using said second different version, wherein said default record is instantiated with default values of said second version; and
looking up said catalog to find differences between said first version's and said second version's schemas, and automatically using said first version's data to replace data in said default record;
wherein if there is a correspondence between said first version's column and said second version's column, a direct copy is performed, with type casting if it is necessary;
wherein if there is no such correspondence for said first version's column, that column is dropped; and
wherein a new record is created containing said second version's schema with either said first version's data or the default value of said second version.

17. The datahub server of claim 14, wherein said configuration file is setup per data ingestion task to address schema mapping and other heterogeneity issues using any of the following properties:
a least two properties that identify to which schema and version source files go;
a property that identifies a date format used by the source data;
a property that defines mappings between the source data's schema and a destination schema;
a property that identifies to which physical table partition the source data goes;
a property that identifies a file transfer protocol;
a property that identifies a user name that is used to login to a data source server; and
a property that identifies a password that is used to login to the data source server.

18. The datahub server of claim 14, said datahub server further comprising:
a record abstraction facility for version reconciliation;
wherein a record is a class, data structure, storing one tuple of a given schema and a given version combination, said record comprising a value array and a versioned schema;
wherein the value array holds a binary of the data and the schema keeps meta-data for the data; and
wherein the schema is an in-memory representation of a versioned schema specified in the catalog.

19. The datahub server of claim 18, said record abstraction facility further comprising:
a function which, when invoked, converts a current record to a latest version of the current record's schema by consulting the catalog.

20. A process, comprising:
providing a processor implemented framework for leveraging a MapReduce environment to route source data to a destination;
said framework consulting meta-data to carry out different instances of a pipeline to perform ingestion tasks;
wherein meta-data modeling during data ingestion comprises destination schema modeling via a catalog, and client configuration modeling per ingestion task via a configuration file.

21. The process of claim 20, said catalog supporting schema evolution without changing framework code by modeling destination schema using any of the following schema properties:

- a property that maintains an integer array representing all available schemas, wherein for each table schema, a unique integer is assigned as its identity (ID);
- a property that stores a descriptive name of a table identified by ID;
- a property that stores a latest version of a table identified by ID;
- a property that stores an absolute Hadoop file system (HDFS) path where a table identified by ID is stored;
- a property that stores a versioned schema of a table identified by ID; and
- a property that stores default values of a versioned schema of a table identified by ID;
- wherein said properties record an evolvement history of each schema; and
- wherein a record can be dynamically evolved from an earlier version of a given schema to a later version of the same schema by consulting said catalog.

22. The process of claim 21, wherein record evolvement to a same schema from a first version to a second version comprises:

- creating a default record of a same schema using said second different version, wherein said default record is instantiated with default values of said second version; and
- looking up said catalog to find differences between said first version's and said second version's schemas, and automatically using said first version's data to replace data in said default record;
- wherein if there is a correspondence between said first version's column and said second version's column, a direct copy is performed, with type casting if it is necessary;
- wherein if there is no such correspondence for said first version's column, that column is dropped; and
- wherein a new record is created containing said second version's schema with either said first version's data or the default value of said second version.

23. The process of claim 20, wherein said configuration file is setup per data ingestion task to address schema mapping and other heterogeneity issues using any of the following properties:

- one or more properties that identify to which schema and version source files go;
- a property that identifies a date format used by the source data;
- a property that defines mappings between the source data's schema and a destination schema;
- a property that identifies to which physical table partition the source data goes;
- a property that identifies a file transfer protocol;
- a property that identifies a user name that is used to login to a data source server; and
- a property that identifies a password that is used to login to the data source server.

24. The process of claim 20, further comprising:

- providing a record abstraction facility for version reconciliation;
- wherein a record is a class, data structure, storing one tuple of a given schema and a given version combination, said record comprising a value array and a versioned schema;
- wherein the value array holds a binary of the data and the schema keeps meta-data for the data; and
- wherein the schema is an in-memory representation of a versioned schema specified in the catalog.

25. The process of claim 24, further comprising:

- providing a function which, when invoked, converts a current record to a latest version of the current record's schema.

26. A method for automatically ingesting data into a data warehouse, comprising:

- providing a datahub server for following one or more configuration files to load a plurality of heterogeneous sources of data into a Hadoop file system (HDFS);
- said datahub server launching a MapReduce job to join all of said heterogeneous data sources with existing data in a common destination schema; and
- said datahub server performing a join task to join client data with existing data of a same schema by launching a MapReduce job which reads all newly arrived data and the existing data of the destination schema, and which performs the join in a reducer of a MapReduce framework.

27. An apparatus for automatically ingesting data into a data warehouse, comprising:

- a datahub server following one or more configuration files to load a plurality of heterogeneous sources of data into a Hadoop file system (HDFS);
- said datahub server launching a MapReduce job to join all of said heterogeneous data sources with existing data in a common destination schema; and
- said datahub server performing a join task to join client data with existing data of a same schema by launching a MapReduce job which reads all newly arrived data and the existing data of the destination schema, and which performs the join in a reducer of a MapReduce framework.

* * * * *